United States Patent
Ling et al.

(10) Patent No.: US 7,425,948 B2
(45) Date of Patent: Sep. 16, 2008

(54) PORTABLE APPARATUS AND STYLUS USABLE AS SUPPORT PROP

(76) Inventors: Yao-Chung Ling, No. 23, Singhua Rd., Taoyuan City, Taoyuan County (TW) 330; I-Cheng Chuang, No. 23, Singhua Rd., Taoyuan City, Taoyuan County (TW) 330; Francois Bellet-Odent, 3F, N7 Lane 62 Sec 2 Jinan Rd, Taipei City, Zhongzhen (TW) 100

( * ) Notice: Subject to any disclaimer, the term of this patent is extended or adjusted under 35 U.S.C. 154(b) by 0 days.

(21) Appl. No.: 11/556,601

(22) Filed: Nov. 3, 2006

(65) Prior Publication Data

US 2007/0117430 A1     May 24, 2007

(30) Foreign Application Priority Data

Nov. 23, 2005    (TW)  ............... 94141191 A

(51) Int. Cl.
*G09G 9/00*     (2006.01)
(52) U.S. Cl. ...................... 345/179; 248/688
(58) Field of Classification Search ............... 439/894; 345/179, 173; 248/688, 455; 361/686
See application file for complete search history.

(56) References Cited

U.S. PATENT DOCUMENTS

| | | | | |
|---|---|---|---|---|
| 4,113,212 A | * | 9/1978 | Coriden | ............ 248/455 |
| 4,317,638 A | * | 3/1982 | Klaber | ............ 401/195 |
| 4,940,204 A | * | 7/1990 | Nelson et al. | ............ 248/688 |
| 6,003,831 A | * | 12/1999 | Coleman | ............ 248/688 |
| 7,042,713 B2 | * | 5/2006 | Nicolosi | ............ 361/681 |
| 2006/0044288 A1 | * | 3/2006 | Nakamura et al. | ............ 345/179 |

* cited by examiner

*Primary Examiner*—Neil Abrams
(74) *Attorney, Agent, or Firm*—Theodore Lapus

(57) ABSTRACT

A stylus for a portable apparatus is disclosed. The stylus is usable as a prop to support the portable apparatus to stand on a platform and comprises a main portion and a rotating portion. The main portion comprises a tip end and a pivot end, and at least one protruding rib is disposed on the pivot end. A positioning plate is disposed on one end of the rotating portion, and connects with the protruding rib. A bolt passes through the protruding rib and the positioning plate, so that the rotating portion could pivotably connect with the main portion. Furthermore, at least one positioning structure is formed on one end of the positioning plate. The cross-sectional shape of the positioning structure is an arc shape. The stylus further comprises an elastic component and a positioning ball. The elastic component presses the positioning ball in the positioning structure, so that the portable apparatus could stand on a table surface. In addition, at least one groove is disposed on the sidewalls of the stylus. An elastic tenon of the portable apparatus could cling to the grooves, so that the inclination of the portable apparatus could be adjusted on the table surface.

18 Claims, 8 Drawing Sheets

PORTABLE APPARATUS AND STYLUS USABLE AS SUPPORT PROP

FIELD OF THE INVENTION

The present invention relates to a portable apparatus and a stylus and, more particularly, to the portable apparatus and the stylus which has a supporting function.

BACKGROUND OF THE INVENTION

Information appliance (IA) is a new milestone after experiencing the computer generation. The IA is an apparatus that has communication or internet connection capabilities, and has information and entertainment functions. According to the aforesaid description, the IA could provide a user to connect a network for performing voice communication, transmitting/receiving data and network browsing. Therefore, various notebook computers, a mobile phone and a personal digital assistant (PDA) are portable products that are so welcome in the electronic market. These portable products must be developed toward smaller volume and thin thickness due to the portability tendency In these portable products, the PDA is one of the most welcome portable products and its basic function is similar to a conventional notebook, including a schedule, an address book, a record, etc. Moreover, the PDA also has information transmission capability with a personal computer so as to download infinite resources from internet. Therefore, the PDA is a portable information carrier that is suitable for users.

Referring to FIG. 1, a schematic diagram illustrates a conventional PDA.

The PDA 100 includes a host 102, a liquid crystal display (LCD) 104 and a stylus 106. The LCD 104 is disposed on a surface of the host 102 in order to form an input interface and a display interface, and has a touch panel function. The stylus 106 can perform the selection/operation on the LCD 104. The stylus 106 is usually stored in a groove 108 of the host 102. When a user want to use the PDA 100, the stylus 106 is drawn out from the PDA 100 to perform the selection/operation on the LCD 104 as shown in FIG. 1.

However, when the user would like to operate the PDA 100, the host 102 is unable to stand on a table, thereby causing an operating inconvenience. A conventional manner is described hereinafter: The user directly uses hands to hold the host 102 or needs to purchase a charger to allow the host 102 to stand on the table. When the PDA development tends toward a smaller volume and a thin thickness, the aforesaid manner may cause inconvenience while in use. The manufacture cost, the volume and the weight are also increased.

SUMMARY OF THE INVENTION

Accordingly, an aspect of the present invention is to provide a portable apparatus and a stylus structure. When the volume of the portable apparatus is not increased, the stylus does not only provide selection manipulation on a display panel, but also supports the portable apparatus that can stand on a table or a platform.

In accordance with the aspect of the present invention, the stylus structure comprises a main portion and a rotating portion. The rotating portion is pivotally connected to the main portion, and provides at least a specific rotating angle. The main portion includes a tip end and a pivot end. The pivot end has at least a protruding rib. The rotating portion includes a positioning plate that is pivotally connected to the protruding rib. The protruding rib includes a first plane and a first blot hole. The positioning plate has a second plane and a second blot hole. When a bolt penetrates the first bolt hole and the second bolt hole, the positioning plate is pivotally connected to the protruding rib. Moreover, an end of the positioning plate has at least a positioning structure. A cross-section shape of the positioning structure is an arc concave. The stylus further includes an elastic component and a positioning ball. Each concave radius of the positioning structure is equivalent to a radius of the positioning ball. The positioning ball is against the positioning structure through the elastic component. The rotating portion and the main portion are formed at least one specific rotating angle. Therefore, the portable apparatus could stand on a table. Furthermore, the stylus further comprises at least one groove or a ratchet wheel for cooperating with an elastic tenon of the portable apparatus so as to change an inclination of the portable apparatus.

A second aspect of the present invention is to provide a portable apparatus that has a host which includes a groove, a display panel and a stylus. The display panel is disposed on a surface of the host, and has a touch function and the stylus is disposed in the groove. The stylus comprises a main portion and a rotating portion. The rotating portion is pivotally connected to the main portion for providing at least a specific rotating angle. The main portion includes a tip end and a pivot end. The pivot end has at least a protruding rib. The rotating portion has positioning plate that is pivotally connected to the protruding rib. The protruding rib has a first plane and a first bolt hole. The positioning plate includes a second plane and a second bolt hole. When a bolt penetrates the first bolt hole and the second bolt hole, the positioning plate then is pivotally connected to the protruding rib. Moreover, an end of the positioning rib has at least a positioning structure. A cross-section shape of the positioning structure is an arc concave. The stylus further includes an elastic component and a positioning ball. Each concave radius of the positioning structure is equivalent to a radius of the positioning ball. The positioning ball is against the positioning structure through the elastic component. The rotating portion then is rotated according to the main portion. Therefore, the portable apparatus could stand on a table Furthermore, a side wall of the main portion of the stylus further has at least a groove and an interior wall of the groove of the portable apparatus has an elastic tenon. The elastic tenon could incorporate with the groove. When the stylus rotates around a principle axis, the elastic tenon is selectively fastened in those grooves. Therefore, the portable apparatus does not only stand on the table, but also adjust different inclinations.

Alternatively, the present invention does not limit groove designs as described above. The side wall of the main portion of the stylus has a ratchet wheel which has at least a ratchet tooth that incorporates with the elastic tenon of the interior wall of the groove. When the stylus rotates around a principle axis, the elastic tenon is selectively fastened to intervals between ratchet teeth. Therefore, the portable apparatus is capable of performing any inclination degrees.

Of course, the present invention does limit grooves or ratchet wheels as above-mentioned designs. A friction sheet is disposed on a sidewall of the main portion of the stylus. The friction sheet can also incorporate with the elastic tenon on the interior wall of the groove. When the stylus rotates around the principle axis, the elastic tenon is selectively fastened to the friction sheet. Therefore, the portable apparatus is capable of performing any inclination degrees.

A third aspect of the present invention is to provide a stylus structure that has a main portion and a rotating portion. The rotating portion is pivotally connected to the main portion, and is capable of providing at least a specific rotating angle for controlling the inclination of a portable apparatus. The main portion includes a tip end and a pivot end. The pivot end includes at least a protruding rib. The rotating portion has a positioning plate that is pivotally connected to the protruding rib. The protruding rib has a first plane and a first bolt hole. The positioning plate includes a second plane and a second bolt hole. When the bolt penetrates the first bolt hole and the second bolt hole, the positioning plate then is pivotally connected to the protruding rib. Moreover, an end of the positioning plate has at least a positioning structure. Cross-section shape of the positioning structure is an arc concave. The stylus further includes an elastic component and a positioning ball. Each concave radius of the positioning structure is equivalent to a radius of the positioning ball. The positioning ball is against the positioning structure through the elastic component. The rotating portion and the main portion are formed a specific rotating angle. The portable apparatus then stands on a table. The stylus also includes at least a groove or a ratchet wheel. The groove and the ratchet wheel could incorporate with an elastic tenon of the portable apparatus so as to change the inclination of the portable apparatus.

Other features and advantages of the present invention and variations thereof will become apparent from the following description, drawings, and claims.

DETAILED DESCRIPTION OF THE PREFERRED EMBODIMENTS

A stylus in the present invention is divided into a main portion and a rotating portion. The main portion and the rotating portion are pivotally connected by using the rotation manner. The stylus does not only provide selection function on a display panel, but also enables a portable apparatus to stand on a table.

Figure 1:
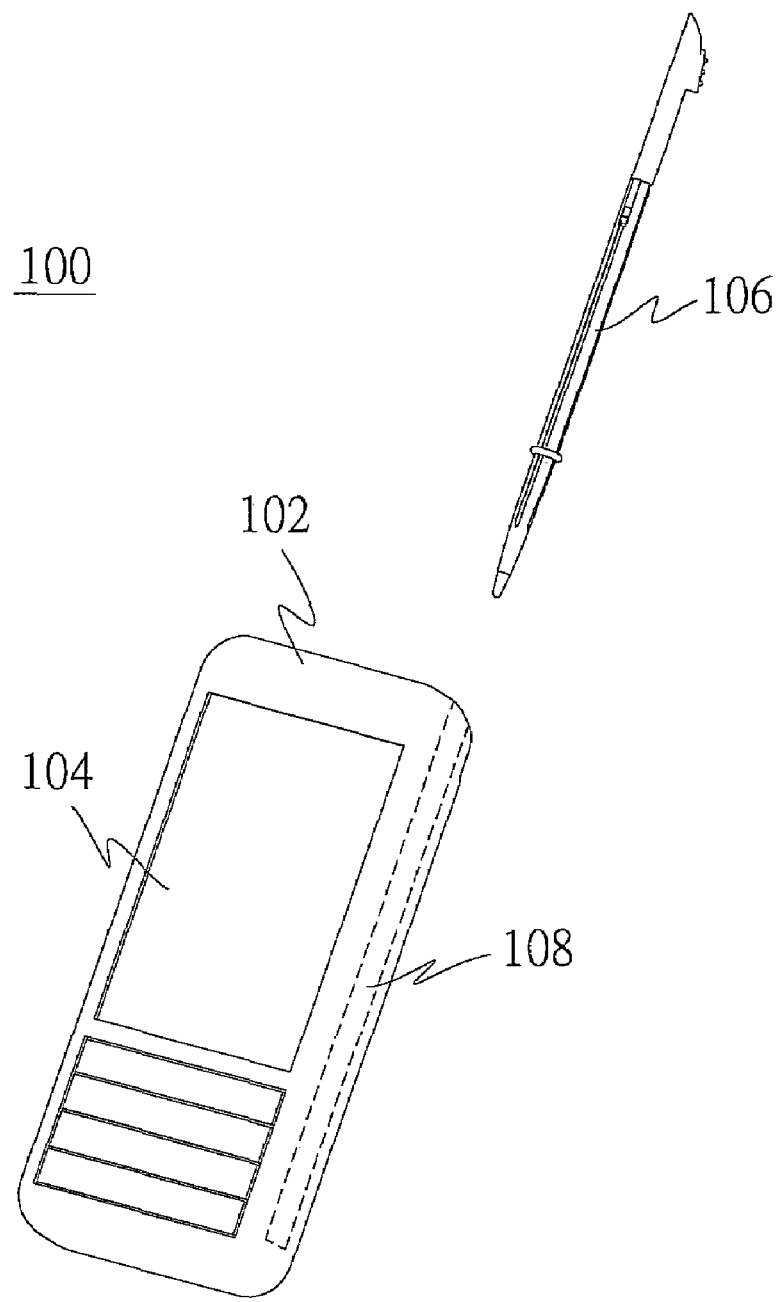
FIG. 1 is a schematic diagram illustrating a conventional personal digital assistant (PDA)
Figure 2A:
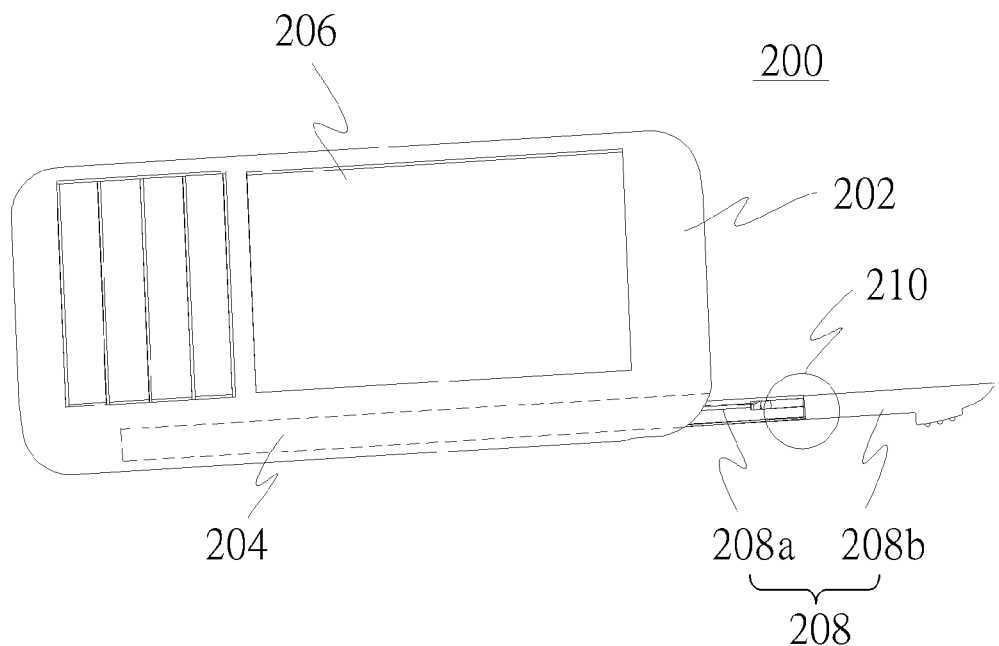
FIG. 2A is a schematic diagram illustrating that a stylus is drawn out from a portable apparatus according to a preferred embodiment of the present invention.

Referring to FIG. 2A~2D, schematic diagrams illustrate a portable apparatus and a stylus according to preferred embodiments of the present invention. Referring to FIG. 2A, a schematic diagram illustrates that the stylus 208 is drawn out from the portable apparatus 200. The portable apparatus 200 comprises a host 202, a display panel 206 and the stylus 208. The host 204 has a groove 204. The touch panel 206 is disposed on a surface of the host 202 in order to be an input interface and a display interface, and also has touch function. The stylus 208 is for selecting or operating on the display panel 206, and is disposed into the groove 204 of the host 202. The portable apparatus 200 in the present invention is preferably a personal digital assistant (PDA). The stylus 208 can be separated into a main portion 208a and a rotating portion 208b. The rotating portion 208b is pivotally connected to the main portion 208a for providing at least a specific rotating angle. A pivot portion 210 is to pivotally connect the main portion 208a and the rotating portion 208b. The display panel is preferably a liquid crystal panel. As shown, a portion of the stylus 208 is drawn out from the portable apparatus. The rotating portion 208b comes out from the portable apparatus. The main portion 208a is still stored in the groove 204 of the host 202.

Figure 2B:
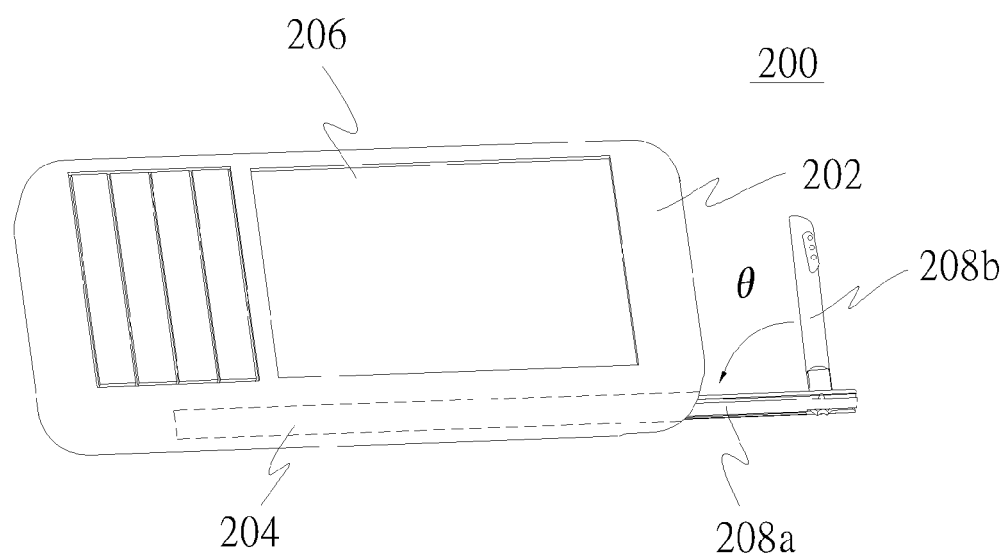
FIG. 2B is a schematic diagram illustrating that the stylus provides a support according to a preferred embodiment of the present invention.

Referring to FIG. 2B, a schematic diagram illustrates that the stylus 208 provides support function. The rotating portion 208b of the stylus 208 could perform a radial rotation relative to the main portion 208a so as to form a specific rotating angle θ. The rotating angle θ is about ninety degree. Therefore, the host 202 is supported by the stylus 208 to allow the portable apparatus 200 to stand on a table.

Figure 2C:
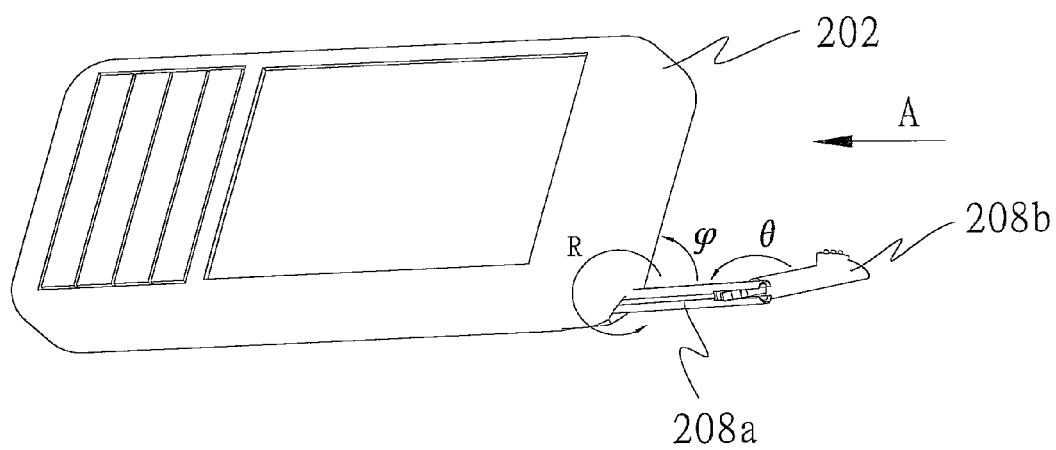
FIG. 2C is a schematic diagram illustrating that the stylus could change inclination degrees of the portable apparatus according to a preferred embodiment of the present invention.
Figure 2D:
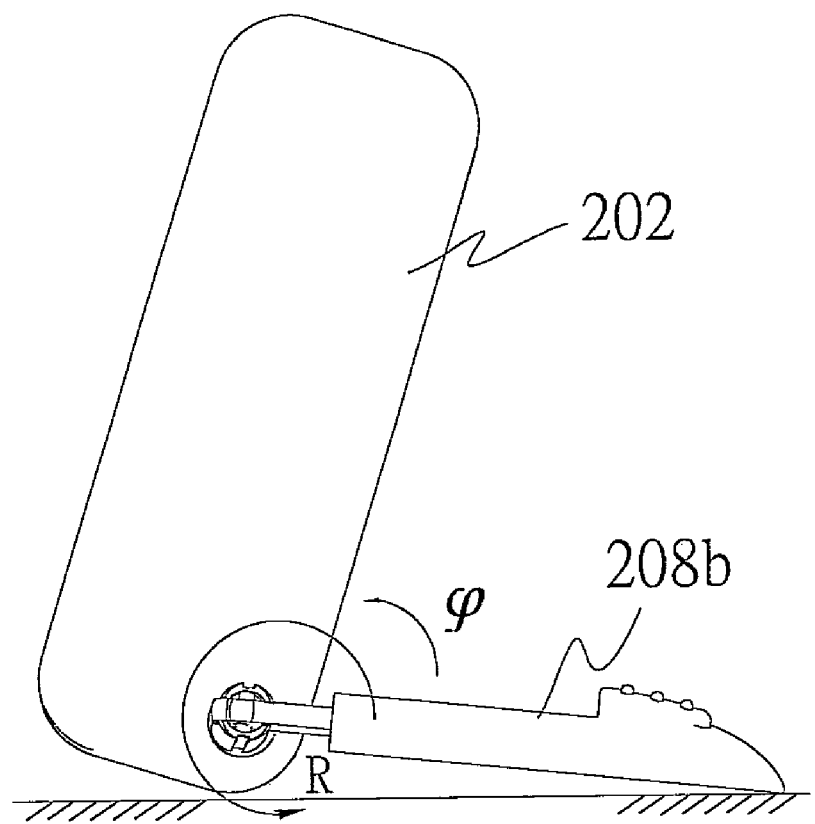
FIG. 2D is a side elevation drawing according to FIG. 2C.

Referring to FIG. 2C and 2D, FIG. 2C is a schematic diagram illustrating that the stylus 208 could change the inclination of the portable apparatus 200. FIG. 2D is a side elevation diagram of FIG. 2C. in the direction of arrow A. When a user would like to change the inclination φ of the portable apparatus 200 to achieve a better visual angle, the main portion 208a of the stylus 208 rotates around a principle axis. In other words, the main portion 208a rotates around an arrow R which is vertical to the principle axis, so as to change the inclination φ of the host 202.

Figure 3A:
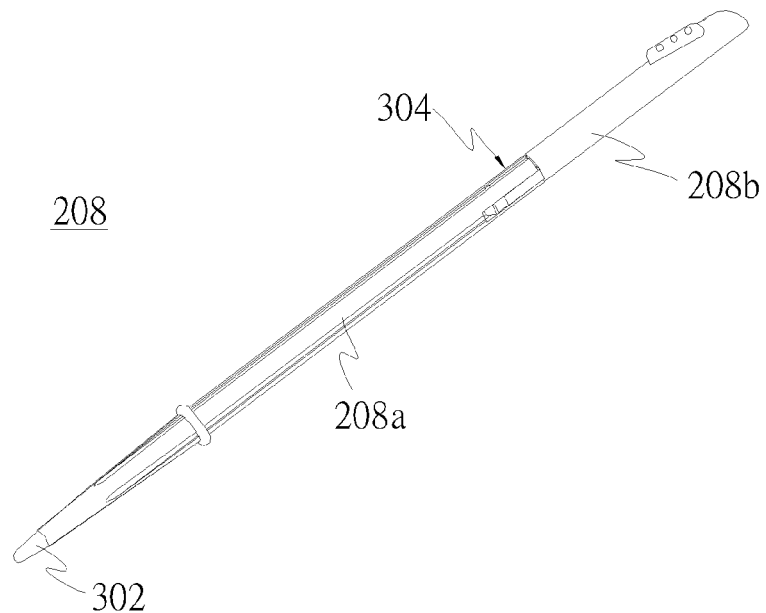
FIG. 3A is a schematic diagram illustrating a composition for the stylus according to a preferred embodiment of the present invention.
Figure 3B:
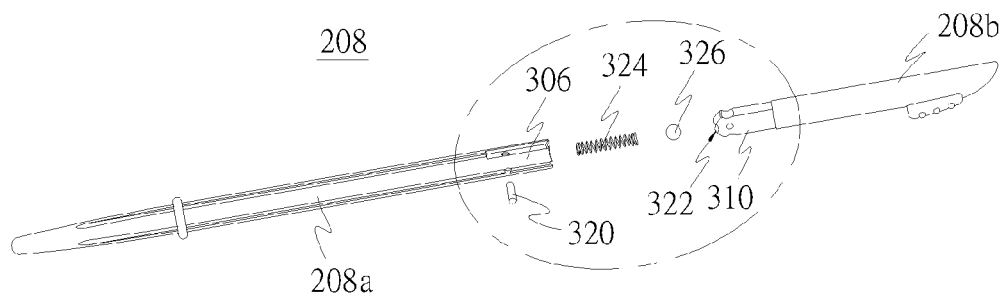
FIG. 3B is a schematic diagram illustrating a decomposition for each component of the stylus according to a preferred embodiment of the present invention.
Figure 3C:
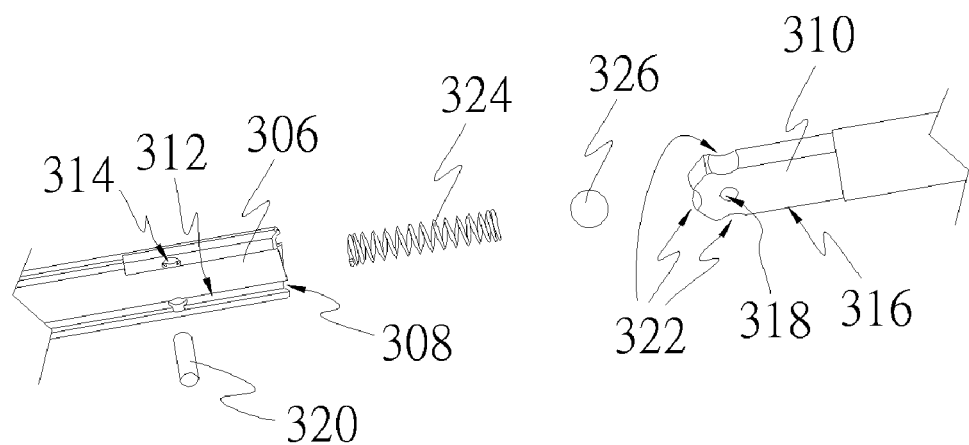
FIG. 3C is an enlarged drawing according to FIG. 3B.
Figure 3D:
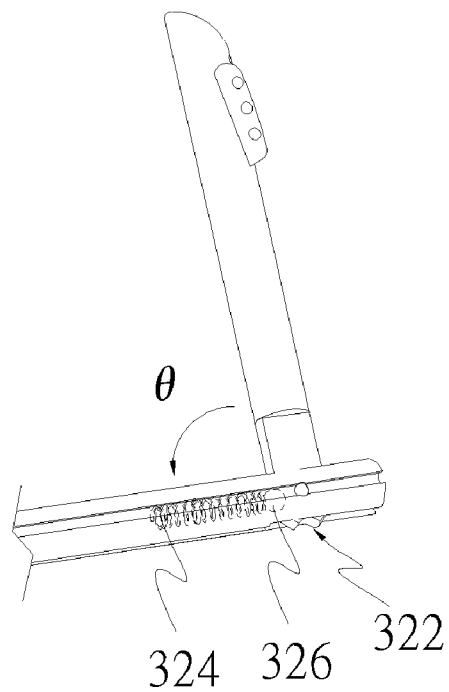
FIG. 3D is a schematic diagram illustrating that the stylus is in rotation.

Referring to FIG. 3A~3D, schematic diagrams illustrate the stylus according to preferred embodiments of the present invention. FIG. 3A is an assembly drawing illustrating the stylus. FIG. 3B is an exploded assembly drawing illustrating each part of the stylus. FIG. 3C is an enlarged drawing according to FIG. 3B. FIG. 3D is a schematic diagram illustrating the stylus in rotation. If FIG. 3A~3D and FIG. 2A~2D have the same elements, the same serial numbers then are continually applied.

Referring to FIG. 3A, the stylus 208 includes the main portion 208a and the rotating portion 208b. The rotating portion 208b is pivotally connected to the main portion 208a for providing a specific rotating angle. The main portion 208a includes a tip end 302 and a pivot end 304. The tip end 302 is used to perform the selection or operation on the display panel 206. The main portion 208a is pivotally connected to the rotating portion 208b through the pivot end 304.

Referring to FIG. 3B and FIG. 3C, the main portion 208a has at least a protruding rib 306 that is extended to the rotating portion 208b from the main portion 208a. The present invention has two protruding ribs 306 corresponding to each other. Moreover, an interval 308 is formed between the two protruding ribs 306. The rotating portion 208b includes a positioning plate 310 that can be inserted into the interval 308 so as to pivotally connect the protruding rib 306. Moreover, the protruding rib 306 includes a first plane 312 and a first bolt hole 314. The positioning plate 310 has a second plane 316 and a second bolt hole 318. As shown in FIG. 3B and FIG. 3C, the present invention further comprises a bolt 320 that penetrates the first bolt hole 314 of the protruding rib 306 and the second bolt hole 318 of the positioning plate 310 to allow the positioning plate 310 to be pivotally connected to the protruding rib 306. The first plane 312 is adjoined the second plane 316. Furthermore, an end of the positioning plate 210 neighbored with the main portion 208a comprises at least a positioning structure 322. In the embodiment, the positioning plate 210 includes three positioning structures 322. The stylus 208 also comprises an elastic component 324 and a positioning ball 326. The positioning ball 326 is against the positioning structure 322 through the elastic component 324. When the rotating portion 208b rotates relative to the main portion 208a, the positioning ball 326 is against different positioning structures 322 through a force applied by a user. The rotating portion 208b and the main portion 208a then are formed a specific rotating angle θ as shown in FIG. 3D and FIG. 2B. The rotating angle is about ninety degree.

Figure 4A:
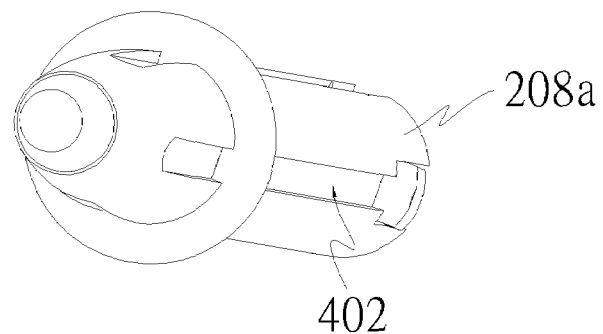
FIG. 4A is a stereogram illustrating the stylus according to a preferred embodiment of the present invention.

Referring to FIG. 4A, a front stereogram illustrates the stylus 208. A sidewall of the main portion 208a further includes at least a groove 402.

Figure 4B:
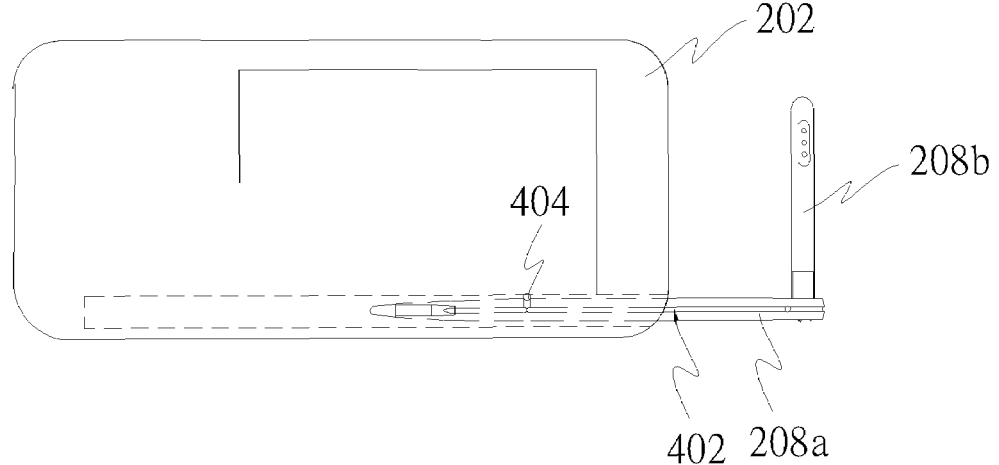
FIG. 4B is a schematic diagram illustrating that the main portion of the stylus incorporates with the host of the portable apparatus so as to change inclination degrees.

Referring to FIG. 4B, a schematic diagram illustrates that the main portion 208a of the stylus 208 incorporates with the host 202 of the portable apparatus 200 to change the inclination. Referring to FIG. 2C-2D and FIG. 4B simultaneously, an interior wall of the groove 204 of the host 202 has an elastic tenon 404. When the main portion 208a of the stylus 208 rotates around a principle axis as an arrow R, the elastic tenon 404 is selectively fastened into any groove 402 of the stylus 208, thereby changing the inclination ϕ of the host 202 with a multi-stage control. Therefore, the host 202 then is capable of performing any inclination degrees as shown in FIG. 2C-2D.

Figure 4C:
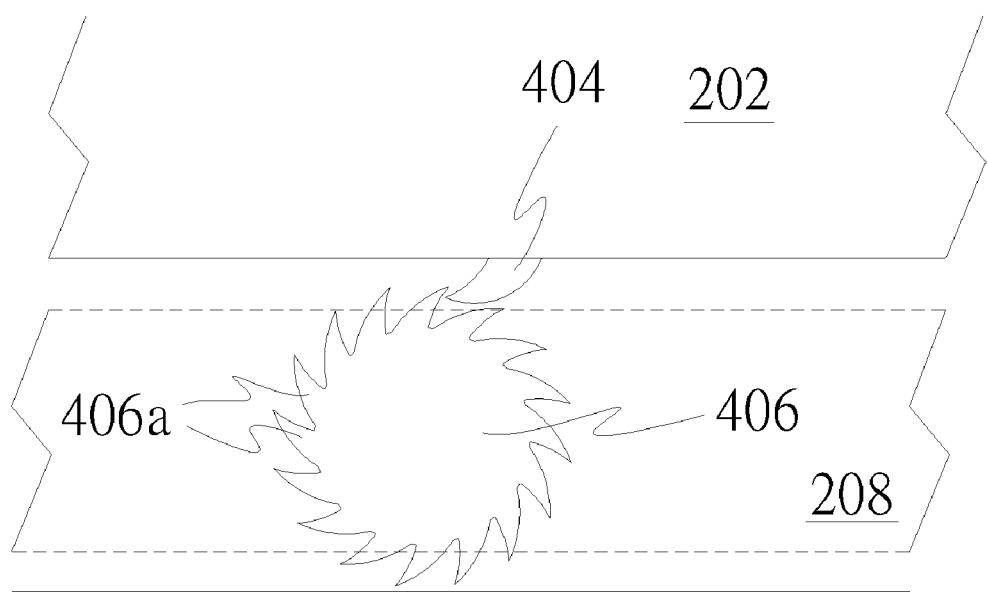
FIG. 4C is a schematic diagram illustrating that the main portion of the stylus incorporates with the host of the portable apparatus so as to change inclination degrees.

Referring to FIG. 4C, a schematic diagram illustrates that the main portion 208a of the stylus 208 incorporating with the host 202 of the portable apparatus 200 to change inclination degrees. The main portion 208a of the stylus 208 further has a ratchet wheel 406 that includes at least a ratchet tooth 406a. The interior wall of the groove of the host 202 has at least an elastic tenon 404. When the user would like to change the inclination degrees of the portable apparatus 200, the user only imposes forces to allow the main portion 208a of the stylus 208 to be rotated around the principle axis as the arrow R (shown in FIG. 4B). Therefore, the elastic tenon 404 is selectively fastened to any ratchet tooth 406a of the ratchet wheel 406. The inclination ϕ of the host 202 then is changed with the multi-stage control. The host 202 is capable of performing any inclination degrees as shown in FIG. 2C-2D.

The present invention does not limit the multi-stage control for the elastic tenon 404 and the groove 402 or another multi-stage control for the elastic tenon 404 and the ratchet wheel 406. The sidewall of the main portion 208a of the stylus 208 further has a friction sheet that then incorporates with the elastic tenon 404 disposed in the interior wall of the groove 204. Therefore, the elastic tenon 404 is against the friction sheet of the sidewall of the main portion 208a. The portable apparatus 200 is capable of performing any inclination degrees The stylus disclosed by above preferred embodiments in the present invention is that the main portion is pivotally connected to the rotating portion to provide a specific rotating angle. The sidewall of the main portion is against the interior wall of the groove of the portable apparatus. The stylus does not only provide the selection/operation implemented on the display panel, but also allows the portable apparatus to stand on the table. Moreover, the inclination degree of the portable apparatus can be changed through the stylus. Therefore, the portable apparatus then meets smaller volume and thin thickness. Additional manufacture cost may not be increased.

Although the features and advantages of the embodiments according to the preferred invention are disclosed, it is not limited to the embodiments described above, but encompasses any and all modifications and changes within the spirit and scope of the following claims.

What is claimed is:

1. A portable apparatus, comprising:
   a host having a host groove and an elastic tenon disposed on the interior wall of the host groove;
   a display panel disposed on a surface of the host; and
   a stylus disposed in the host groove, the stylus comprising:
   a main portion having at least one groove or a ratchet wheel; and
   a rotating portion pivotally connected to the main portion and having at least a positioning structure;
   wherein the elastic tenon is fastened in the groove or the ratchet wheel when the stylus is rotated, and the host is capable of performing any inclination degrees, and the rotating portion and the main portion are formed at least a specific rotating angle by the positioning structure so that the stylus can support the portable apparatus to stand on a platform.

2. The portable apparatus of claim 1, wherein the main portion comprises a tip end and a pivot end, and the pivot end is connected to the rotating portion.

3. The portable apparatus of claim 2, wherein the main portion comprises at least a protruding rib, and the protruding rib is disposed on the pivot end of the main portion, and the protruding rib is extended to the rotating portion from the main portion.

4. The portable apparatus of claim 3, wherein the rotating portion includes a positioning plate, and the positioning plate is connected to the protruding rib.

5. The portable apparatus of claim 4, wherein the protruding rib comprises a first plane and a first bolt hole, and the positioning plate comprises a second plane and a second bolt hole.

6. The portable apparatus of claim 5, further comprising a bolt, and the bolt penetrates the first bolt hole of the protruding rib and the second bolt hole of the positioning plate, and the positioning plate is connected to the protruding rib, and the first plane is adjoined the second plane.

7. The portable apparatus of claim 4, wherein an end of the positioning plate neighbored with the main portion comprises the positioning structure.

8. The portable apparatus of claim 1, further comprising an elastic component and a positioning ball, and when the rotating portion is rotated relative to the main portion, the positioning ball is against the positioning structure through the elastic component, and the rotating portion and the main portion are formed the rotating angle.

9. The portable apparatus of claim 1, wherein the rotating angle is about ninety degree.

10. The portable apparatus of claim 1, wherein the ratchet wheel includes at least a ratchet tooth.

11. The portable apparatus of claim 10, wherein the elastic tenon is fastened to the ratchet tooth of the ratchet wheel when the stylus is rotated, and the host is capable of performing any inclination degrees.

12. A stylus for use in a portable apparatus, comprising:
   a main portion having at least one groove or a ratchet wheel; and
   a rotating portion connected to the main portion and having at least a positioning structure;

wherein a elastic tenon of the portable apparatus is fastened in the groove or the ratchet wheel when the stylus is rotated, and the host is capable of performing any inclination degrees, and the rotating portion and the main portion are formed at least a specific rotating angle by the positioning structure so that the stylus can support the portable apparatus to stand on a platform.

13. The stylus of claim 12, wherein the main portion has a tip end and a pivot end, and the pivot end is pivotally connected to the rotating portion.

14. The stylus of claim 13, wherein the main portion comprises at least a protruding rib, and the protruding rib is disposed on the pivot end of the main portion, and the protruding rib is extended to the rotating portion from the main portion.

15. The stylus of claim 14, wherein the rotating portion includes a positioning plate, and the positioning plate is connected to the protruding rib.

16. The stylus of claim 15, wherein an end of the positioning plate which is near the main portion has the positioning structure.

17. The stylus of claim 12 wherein a cross-section shape of the positioning structure is an arc concave.

18. The stylus of claim 12, wherein the rotating angle is about ninety degree.

* * * * *

UNITED STATES PATENT AND TRADEMARK OFFICE
CERTIFICATE OF CORRECTION

PATENT NO. : 7,425,948 B2  Page 1 of 1
APPLICATION NO. : 11/556601
DATED : September 16, 2008
INVENTOR(S) : Yao-Chung Lin et al.

It is certified that error appears in the above-identified patent and that said Letters Patent is hereby corrected as shown below:

On the Title Page, Item (12) should read --Lin et al.--.

Item (76), 1st inventor "Yao-Chung Ling" should read --Lin, Yao-Chung--.

Signed and Sealed this

Third Day of February, 2009

JOHN DOLL
*Acting Director of the United States Patent and Trademark Office*